United States Patent
Spano (10) Patent No.: US 8,291,831 B2
(45) Date of Patent: Oct. 23, 2012

(54) LIMITED EATING AREA HARDWARE BOWL SYSTEM

(76) Inventor: Michael J. Spano, New York, NY (US)

(*) Notice: Subject to any disclaimer, the term of this patent is extended or adjusted under 35 U.S.C. 154(b) by 82 days.

(21) Appl. No.: 13/013,562

(22) Filed: Jan. 25, 2011

(65) Prior Publication Data

US 2012/0186497 A1    Jul. 26, 2012

(51) Int. Cl.
*A47B 85/00* (2006.01)
(52) U.S. Cl. .............. 108/25; 108/26; 206/557
(58) Field of Classification Search .......... 108/26, 108/25; 297/135, 148–155, DIG. 6, 440.14, 297/440.13, 440.1, 440.12, 463.2, 217.1; 248/346.1; 206/72; 428/99, 100, 214
See application file for complete search history.

(56) References Cited

U.S. PATENT DOCUMENTS

| | | | | |
|---|---|---|---|---|
| 3,122,265 A * | 2/1964 | Innis | ............................. | 206/502 |
| 3,610,459 A * | 10/1971 | Hanson | ...................... | 220/23.83 |
| 3,635,522 A * | 1/1972 | Kerwit | ............................. | 108/26 |
| D264,168 S * | 5/1982 | Teuber et al. | ................... | D7/701 |
| 4,927,024 A * | 5/1990 | Lloyd | ........................... | 206/562 |
| 5,975,628 A | 11/1999 | Russell | | |
| 7,475,937 B2 * | 1/2009 | McGrew et al. | ................ | 108/26 |
| 7,625,625 B2 * | 12/2009 | Rios et al. | ...................... | 428/141 |
| 7,966,949 B2 * | 6/2011 | Willey | ............................. | 108/25 |
| 7,992,714 B1 * | 8/2011 | Devault et al. | .................. | 108/26 |
| 2011/0174677 A1 * | 7/2011 | Blondeel et al. | .............. | 206/557 |
| 2011/0192419 A1 * | 8/2011 | Davis | ............................. | 428/198 |
| 2012/0128922 A1 * | 5/2012 | Bowen et al. | ................... | 428/80 |

* cited by examiner

*Primary Examiner* — Jose V Chen
(74) *Attorney, Agent, or Firm* — F. Rhett Brockington (57) ABSTRACT

A feeding station system for organizing and preventing bowls and the like from being turned over or moved about as a person or an animal eats. The system includes a mat having an upper surface with planar fastening areas, where each planar fastening area is fitted with a hook or loop planar fastener. The system includes a vessel having a floor with a lower surface appropriately fitted with a layer of hook or loop fasteners which will fasten to complementary hook or loop fasteners on the mat. In the system a reversible bond between the mat and the vessel is attained when the vessel's layer of hook or loop fasteners is pressed against the mat's hook or loop planar fasteners, causing complementary fasteners to form a reversible bond. The reversible bond can be broken by peeling the vessel away from the mat.

16 Claims, 8 Drawing Sheets

LIMITED EATING AREA HARDWARE BOWL SYSTEM

BACKGROUND OF THE INVENTION

1) Field of the Invention

The invention relates generally to feeding stations and more particularly to a system for organizing and preventing bowls and the like from being turned over or moved about during feeding.

2) Prior Art

The literature on feeding stations primarily reads on feeding children in high chairs. U.S. Pat. No. 5,975,628 to Larry L. Russell teaches a tray for a child's high chair. A section of interlocking elements (not Velcro™) that engage a complementary surface on eating utensils or toys permits removably securing the eating utensil or toy to the tray surface. Tray dimensions may be customized to fit tables of commercially available children's high chairs. The tray may also include a smooth surface that accommodates eating utensils and toys that do not have interlocking elements.

Des. 386,838 to Pini et al. discloses a Mat For Pet Feeding Dish, however nothing is taught about the mat or dishes, nor a system for organizing and preventing bowls and the like from being turned over or moved about during feeding. With a greater percentage of the population taking care of pets indoors there is a need for a feeding system that is better organized and easier to maintain.

SUMMARY OF THE INVENTION

The invention is a system for organizing and preventing bowls and the like from being turned over or moved about during feeding. An advantage of one embodiment is the system keeps the feeding bowls distributed so that an animal, such as a pet, is not crowded from access to a bowl. The system uses Limited Eating Area Hardware (hereinafter known as LEAH), where the system includes a mat having an upper layer with an outer surface that is substantially impervious to water and oils. The system restrains movement of vessels, such as bowls, to a limited eating zone, wherein the zone is substantially limited to the space on and above the mat.

The surface of the mat has one or more planar fastening areas, where a planar fastening area is fitted with hardware, such as one or more hook or loop fastening membranes or a combination thereof (i.e., Velcro™). The hardware enables vessels appropriately fitted with hook or loop fastening membranes or a combination thereof to be reversibly secured. Adhesion is attained when a hook membrane is pressed against a loop membrane, causing the hook and loop fibrous elements to become entangled. A hook membrane adheres to a loop membrane, but not to another hook membrane. Hook membranes are not repelled by other hook membranes, they simply don't adhere. Similarly, loop membranes are not repelled by other loop membranes, they simply don't adhere. Hook and loop membranes are separated by peeling one from the other, with enough force to disentangle the hook and loop fibrous elements.

Examples of vessels appropriately fitted with hook or loop fastening membranes or a combination thereof include the following: containers, holding devices, protective covers and protective holders. Containers typically have hook or loop fastening membranes on the bottom, and examples include bowls, dishes, plates, jars and glasses. Holding devices include cup holders, sippy cups holders, and conventional bowls (for instance for feeding pets and infants), where a holding device holds the utensil that actually contains the drink or food. Protective covers include trivets and mat covers, where a mat cover is used to provide a protective cover for a planar fastening area when the area is not in use. Protective holders include holders that provide protection against mechanical shock and/or thermal or electrical insulation. An examples of a protective holder is an insulated cup holder.

An aspect of the invention is that the mat and vessel can be selected to be disposable and recyclable, such as a plastic mat having a planar fastening area with several strips of loop fastening membranes, and a plastic vessel having a bottom outer surface with a strip of a hook membrane. Alternatively, conventional non-disposable eating utensils and containers can also be selected.

A object of the invention is that the system is suitable as a station for feeding animals, and especially pets such as dogs and cats. In an exemplary applications of the system, the system is fitted as a feeding station for dogs. Typically, during feeding, a bowl containing water, a bowl containing food, and a small treat bowl are presented to the dog(s). Following eating, all bowls are removed, the water bowl is refreshed, the mat is cleaned, mat covers are positioned over the food and treat planar fastening areas, and the water bowl is repositioned on the water planar fastening area. The mat covers prevent food and other detritus from contaminating the hook or loop membrane of the planar fastening area, therein preventing the infestation of insects and bacteria, which can reduce the performance of the hook or loop element fastening membranes.

Another aspect of the invention is that the mat has excellent lay-flat characteristics, that is it is not internally stressed, so that after a rather short period of time it does not tend to curl or buckle, as is commonly the case with many plastic mats. Another object is that the mat is color fast, even in direct sunlight. Cloth and plastic mats are typically not color fast, and often fade or crack after relatively short durations of exposure to the sun. Another object of the invention is that the mat is resistant to staining even to tomato and mustard based foods, and it can be cleaned in a washing machine. Another object of the invention is that the mat is composed of materials to which the hook or loop membranes can be permanently affixed. A good combination is a mat having a high count scrim interlayer coated on both sides with an annealed PVC composition, where the interlayer has a needled fleece (so that the fleece is on both sides of the interlayer), and where one side of the fleece is then impregnated with an over-layer of a highly stable plastic such as PVC or PVDC, which forms the upper layer with the outer surface that is substantially impervious to water and oils.

Another aspect of the invention is that the opposing side of needled fleece has some adherence to the loop side of Velcro, and when combined with cements, such as bituminous, acrylic and epoxy glues it has very good adhesion to properly prepared metal and excellence adhesion to ceramic tiles and the like. The system can include adhering the mat to plates like metal or tiles or other earthen based plates. Tiles are much heavier than just the mat, and in applications where additional weight is required, tiles are an inexpensive addition that are suitable for use with food products. Tiles can also be interlocked, so that a mosaic of tiles faced with the LEAH mat system can be formed. No matter what the size of the animal the LEAH system can be configured so that the bowls remain stationary.

Applications that employ one or a mosaic of tiles faced with the LEAH system would also be appropriate for applications in the bathroom, such as a soap or shampoo holder.

As previously stated, the needled fleece side of the mat has some adherence to the loop side of Velcro. Trucks, cars, boats, planes and trains having trays fitted with strips of loop membrane would serve to secure the relatively light weight mat so that to reversibly secure vessels appropriately fitted with hook or loop fastening membranes or a combination thereof.

BRIEF DESCRIPTION OF THE DRAWINGS

The foregoing and other objects will become readily apparent by referring to the following detailed description and the appended drawings in which;

FIG. 2 is a plan view of a mat having one or more planar fastening areas with various configurations of hook and loop membranes that are sewn to the mat, where the planar fastening areas enable container(s) to be secured to the mat. FIG. 2 also illustrates several embodiments of a lift tab that is sewn to the mat, where lift tab s facilitate decoupling a container secured to a planar fastening area;

FIG. 3 is a bottom view of the bowls shown in FIG. 1a illustrating that the bottom of the bowls have a complimentary hook and loop layer that when positioned on the planar fastening area will fasten to the mat;

FIG. 7a is a cross-sectional view of the mat illustrated in FIG. 7 taken along sectional line 7a-7a;

FIG. 8a is a cross-sectional view of the bowl and mat illustrated in FIG. 8 taken along sectional line 8a-8a;

FIG. 9 is a diagrammatic view illustrating how a tab is used to lift the bowl from mat attached to the tile illustrated in FIG. 8a;

FIG. 11a is a cross-sectional view of the protective cover over the planar fastening area illustrated in FIG. 11 taken along sectional line 11a-11a;

DETAILED DESCRIPTION

Figure 1:
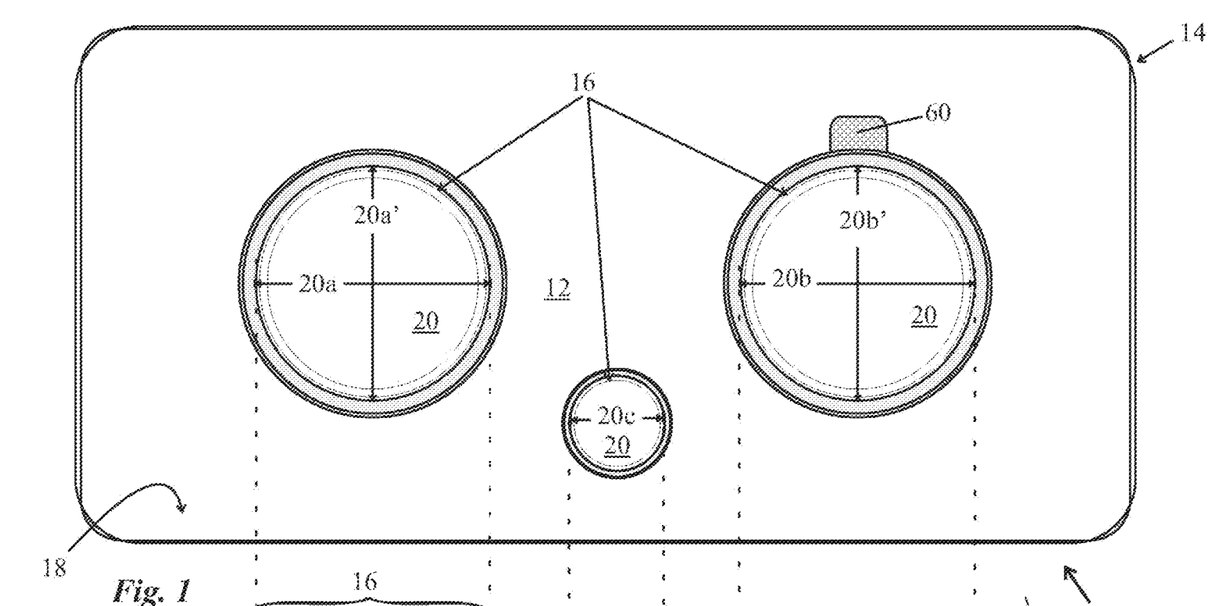
FIG. 1 is a plan view of an embodiment of the invention, a limited eating area hardware system, for organizing and preventing bowls and the like from being turned over or moved about during feeding.

The invention 10 is a system for organizing and preventing bowls and the like from being turned over or moved about during feeding. An embodiment of the invention is shown in FIG. 1, which is a plan view of an embodiment of the invention 10. The invention utilizes limited eating area hardware system, for organizing and preventing bowls and the like from being turned over or moved about during feeding. In the figure are shown a mat 12 and three vessels 20. The illustrated mat 12 is substantially rectangular and it has rounded corners 14, eliminating the possibility of accidentally cutting a user. The exact shape of the mat is not a limitation, so long as it can accommodate the vessels. It could for instance be oval, but in general, a rectangular shape is more material conservative and an easy shape to cut. The mat 12 has an upper surface 18 that is oil and water resistant and at least one planar fastening area 16 under the attached vessels 20. In general the dimensions of a planar fastening area 16 are selected to accommodate the vessel. Therefore, lines 20a and 20b, lines 20a' and 20b', and line 20c define the dimensions of the planar fastening area 16. The type of vessel 20 is indefinite from this view, only the diameters 20a, 20b, 20c. It is apparent that 20c is much shorter than 20a and 20b, which are comparable. Vessels generally can be characterized as either containers, holding devices, protective covers and protective holders. One of the planar fastening areas has a lift tab 60, which can be used to release the vessel from the mat, and lift tabs are discussed in greater detail below.

Figure 1A:
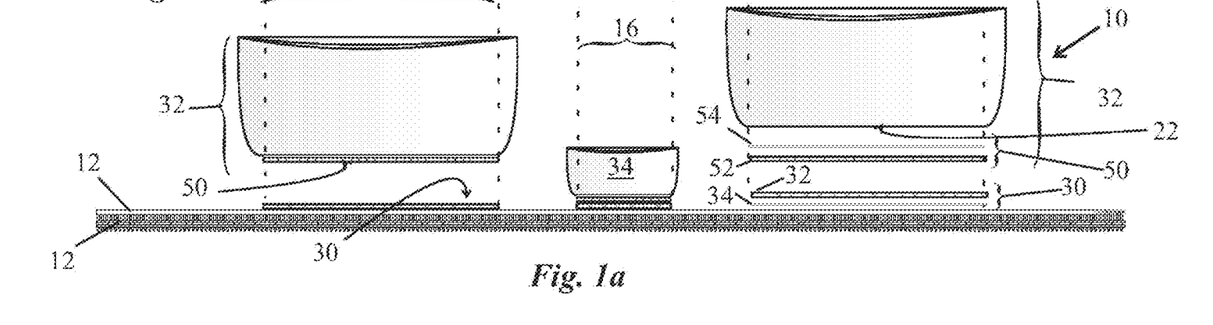
FIG. 1a is a side view of the invention shown in FIG. 1, illustrating that the containers, such as bowls, have a bottom surface fitted with a hook and loop fastener layer that is fastened to a complementary planar fastening area on the mat.

Referring to FIG. 1a, which is a side partially exploded view of the invention shown in FIG. 1, where each of the vessels 20 is appropriately fitted with vessel hook or loop fastening membranes 50 or a combination thereof. The vessel membrane 50 is composed of a hook or loop layer 52 and it is integral to the membrane layer 54. Similarly, the planar fastening area 16 has mat a hook or loop fastening membranes 30 or a combination thereof. The mat hook or loop fastening membrane 30 is typically composed of a hook or loop layer 32 that is integral to the membrane layer 34. The vessel membrane is normally attached to a bottom outer surface 22 of the vessel, as illustrated in the drawing, using an adhesive. The adhesive is not shown. The exact configuration is selected so that hook and loop layers are aligned. In the figures FIG. 1 and FIG. 1a all three vessels are containers, where containers have hook or loop fastening membranes on a bottom surface of the container. Examples of containers include bowls, casseroles, dishes, plates, jars and glasses. Based on size and shape two of the containers are bowls 32 and one is a dish 34.

Other types of vessels include holding devices include cup holders, sippy cups holders and feeding bowls (for pets and infants), where a holding device holds the utensil that actually contains the drink or food. Protective covers include trivets and mat covers, where a mat cover is used to provide a protective cover for a planar fastening area when the area is not in use. Protective holders include holders that provide protection against mechanical shock and/or thermal or electrical insulation. An example of a protective holder is an insulated cup or drink holder.

Figures 2, 3:
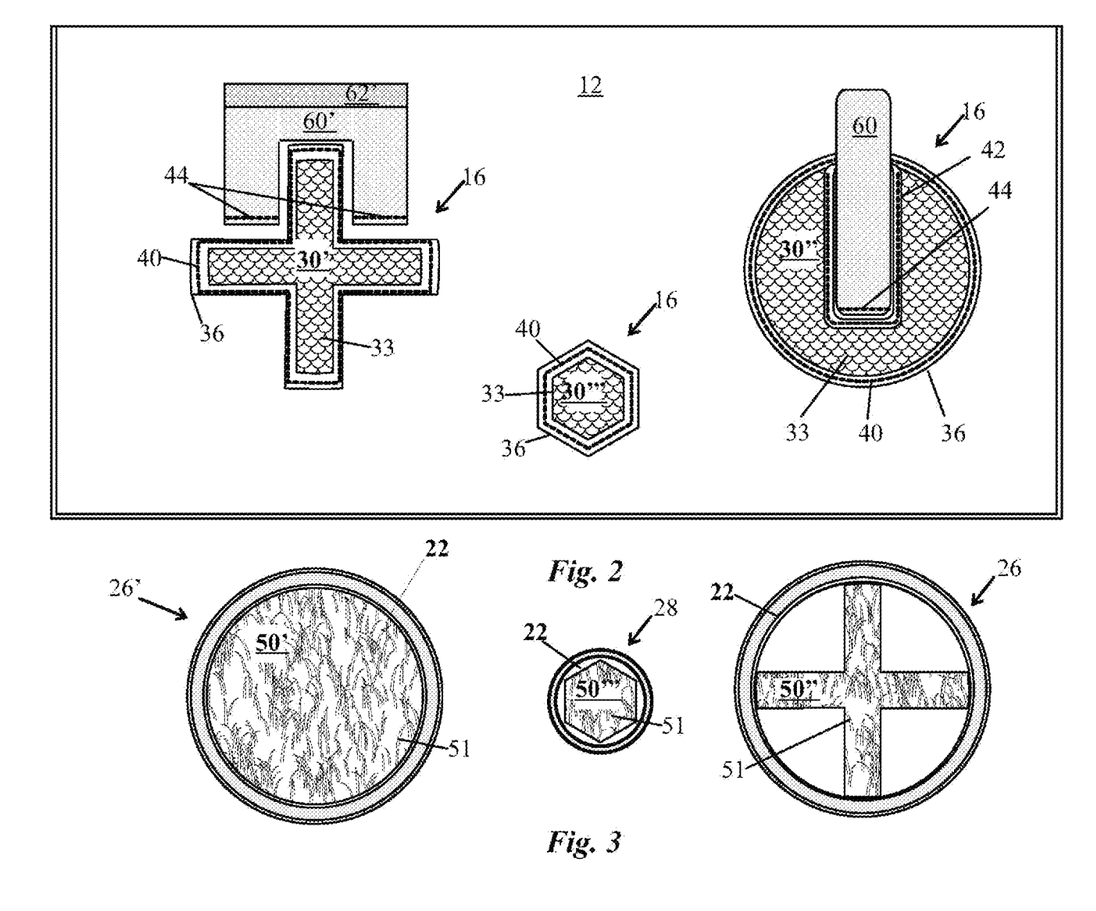

FIG. 2 is a plan view of a mat having one or more planar fastening areas with various configurations of hook and loop membranes that are sewn to the mat, where the planar fastening areas enable container(s) to be secured to the mat. In this view all of the planar fastening areas 16, which are just zones on the mat that have been fitted or will be fitted with a hook and loop membranes hook or loop fastening membranes or a combination thereof that are loops 33. One of the configurations 30' of mat membranes is made up of strips arranged into a plus shape, a second configurations 30" is a circular curvilinear shape, and a third configuration 30'" is hexagonal. Note, that in each of the illustrated embodiments shown in FIG. 2 the membrane has a perimeter skirt 36. The perimeter skirt enables the membrane to be fastened with perimeter stitches 40. The second configuration 30" additionally has interior stitches 42 A couple of lift tabs 60, 60' are also illustrated. An end of the rectangular lift tab 60 is secured to the mat with tab stitches 44, therein facilitating the act breaking an attached vessel (see FIG. 9) free from the mat. An alternate version of the lift tab 60' is illustrated. Lift tab 60' runs parallel to strip of mat membrane 30'. Lift tab 60' is sewn to the mat 12 by stitches 44. The lift tab 60' has a hem 62' with a batten (not visible) to stiffen the wider lift tab 60'. The smaller planar fastening area 16 has a hook or loop fastening membrane 30'" with loops 33. As with the other two membranes, 30', 30", there is a perimeter skirt 36 that enables the membrane to be fastened with perimeter stitches 40.

Referring to FIG. 3, which is a bottom view bowls 26, 26' with a flat bottom and a dish 28 with a flat bottom, where the outer surface 22 is fitted with vessel hook or loop fastening membranes 50', 50", 50'" that are hooks 51. As is readily apparent from the illustrated embodiment, the orientation of the vessel membrane on the mat membrane is neutral, meaning that a vessel hook membrane will align and adhere with a mat loop membrane on the mat (50' to 30'), (50" to 30") (50'" to 30'").

Figure 4:
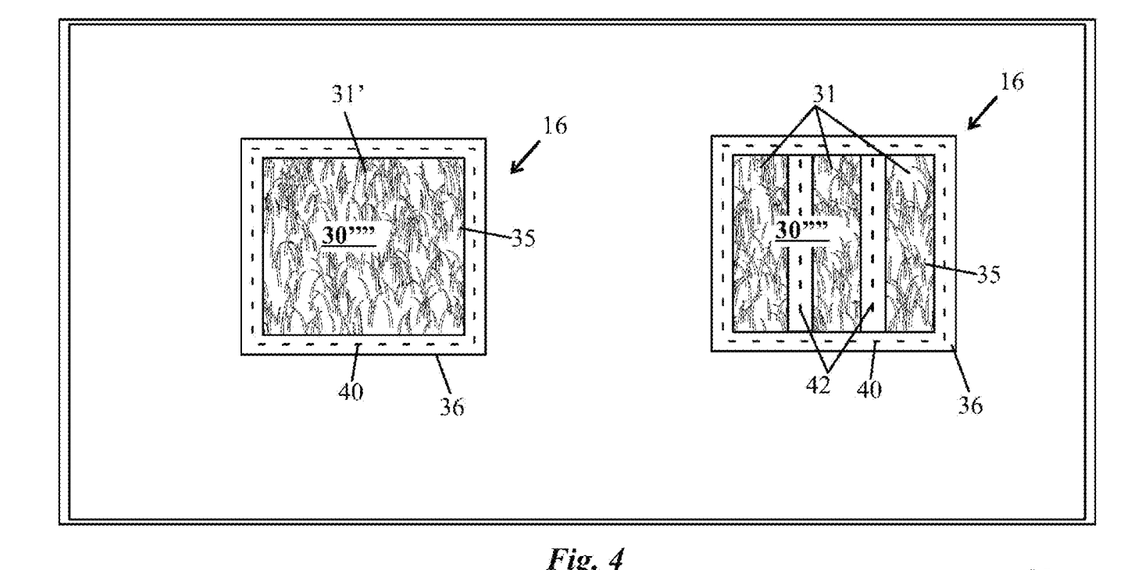
FIG. 4 is a plan view of a mat having a pair of rectangular planar fastening areas, where in one embodiment the hook membrane is sewn to the mat as strips, and it the other embodiment the hook membrane is adhered to the mat with glue and stitches. The rectangular planar fastening areas are particularly suitable for securing rectangular dishes, such as a partitioned plates which are often used when feeding children and securing trivets.
Figure 5:
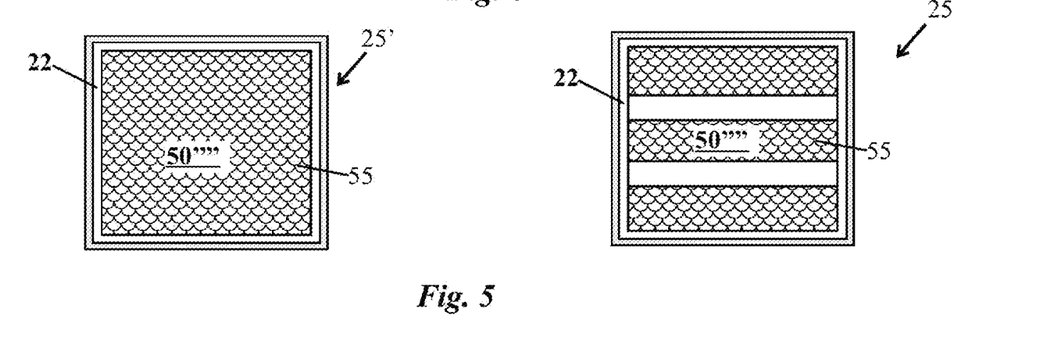
FIG. 5 is a bottom view of a rectangular container illustrating that the bottom of the container would have a loop layer that when positioned on the planar fastening area will fasten to the mat. The loop layer has some adhesion to fuzzy materials such as carpet, fleece, knits and velvet, and a container fitted with the loop layer would be partially secured to a car's carpeted floor.

FIG. 4 and FIG. 5 illustrate how the bottom surface 22 of a vessel, in this case a rectangular dish 25, such as a casserole or partitioned plate, can be fitted with a vessel membrane 50'" having only loops 55 and the planar fastening areas 16 are fitted with a mat fastening membrane 30"" having only hooks 35. The mat 12 has a pair of rectangular planar fastening areas 16, where in one embodiment the hook membrane is sewn to the mat as three narrow strips 31 and in the other embodiment as a single wide strip 31'. The perimeter stitches 40 and are in the perimeter skirt 36, and interior stitches 42 run between the strips 31. Adhesion to the mat can be augmented with a cement, and in other embodiments the hook membrane is adhered to the mat with glue only. Rectangular planar fastening areas are particularly suitable for securing rectangular dishes and securing trivets.

Figure 6:
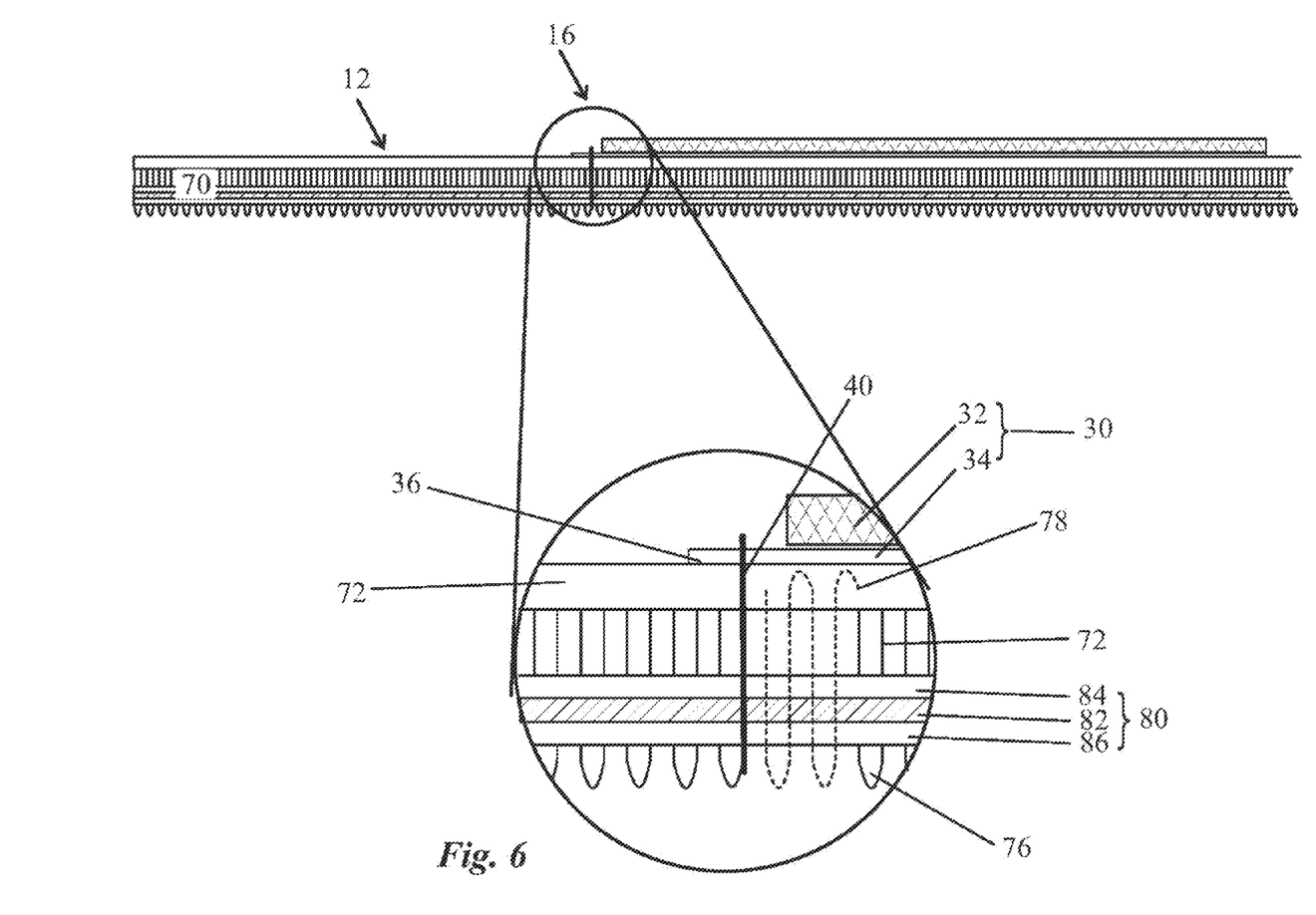
FIG. 6 is an enlarged partial view of an edge of a planar fastening area laminated to the mat, wherein the enlargement also illustrates details of the composition of a mat having particularly suitable properties for the invention.

FIG. 6 is an enlarged partial view of an edge of a planar fastening area 16 a having a hook or loop fastening membranes 30 laminated to the mat 12. The enlargement also illustrates details of a mat material 70 having properties and a composition particularly suitable properties for the invention. The finished mat material 70 has a top layer 72 of plastic and a bottom layer of fleece 76 emanating from an interlayer 80, where the interlayer 80 is a coated scrim 82,84,86. The bottom layer of fleece 76 is formed by needling a felt 76 (shown as a dashed line) through the coated scrim 80 creating an intermediate product that is a double-sided fleece formed on the coated scrim. In other words, there is a top 72 and bottom layer of fleece 76 needled 78 to the coated scrim 80. In a final step, one side of the double-sided fleece is coated with what becomes the top layer 72 of plastic. The plastic used in the top layer 72 is selected to have excellent weathering properties, oil and stain resistant, and water proof. The mat material 70 is very difficult to delaminate because the needling pushes fibers of the felt 78 through the interlayer 80, and the final coating of the top layer 72 of plastic is embedded with fibers (as shown by the dashed line), and delaminating forces, such as caused by peeling apart adhered layers of hook and loop (Velcro) are distributed by the nearly continuous fibers which are both needled and embedded. Typically the coated scrim is a polyester woven material coated on both sides with a plastic very similar to plastic used in the top layer. After each coating the coated material is annealed, eliminating almost all curl or internal stress. The use of a mat material 70 having both a top layer 72 and an interlayer 80 furthermore reduces any tendency to curl. Typically, the plastic coatings are plasticized PVC or PVDC. The total thickness is from about 60 mils to about 120 mils. A PVC top layer is advantageous because there are known adhesives for use with it. The polyester fleece on the bottom side 76 also forms excellent bonds, and the bottom layer of fleece 76 has some natural adherence to loop membranes, which can be utilized to adhere to Velcro type products.

Also illustrated in FIG. 6 is the hook or loop fastening membranes 30, previously shown in FIG. 1a. The mat hook or loop fastening membrane 30 is typically composed of a hook or loop layer 32 that is integral to the membrane layer 34. In the illustrated embodiment the membrane layer 34 has a skirt 36 that is used to stitch 40 to the hook or loop fastening membrane 30 to the mat 12.

Figure 7:
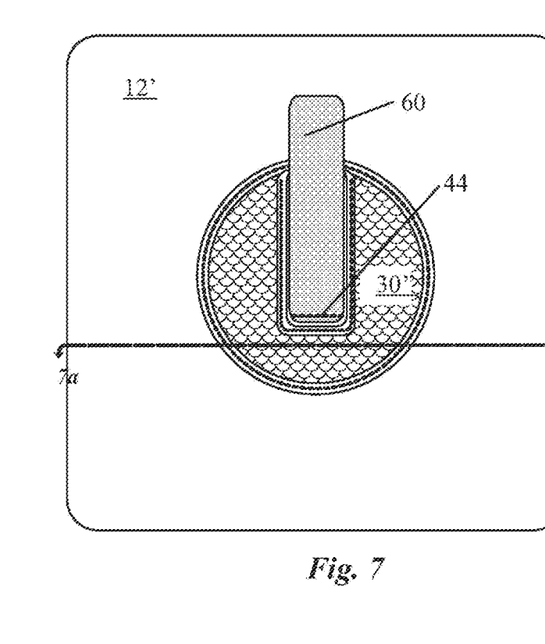
FIG. 7 is a planar view of a mat mounted on a base, such as a square tile, where the mat has loop fastening membrane mounted to the mat and a lift tab having an end that is sewn to the mat.
Figure 7A:
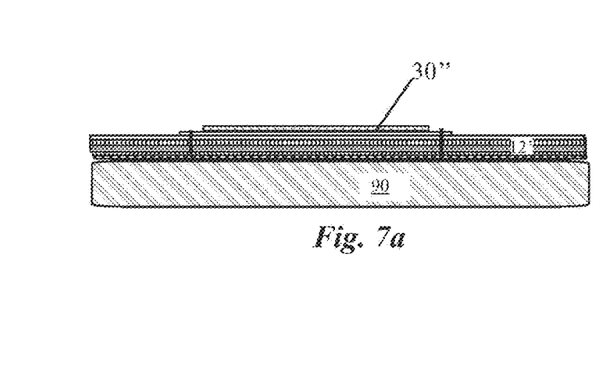

Referring to FIG. 7, which is a planar view of a square mat 12', versus the previously illustrated rectangular mat 12 in FIG. 1, is mounted on a base 90, such as a square tile, where illustrated square mat 12' as shown has a loop fastening membrane 30" as shown in FIG. 3 has a lift tab 60 having an end that is sewn 40 to the mat 12'. FIG. 7a, which is a cross-sectional view of the mat taken along sectional line 7a-7a illustrates that the base 90 (tile or other type of plate) is relatively thick compared to the membrane 12'.

Figure 8:
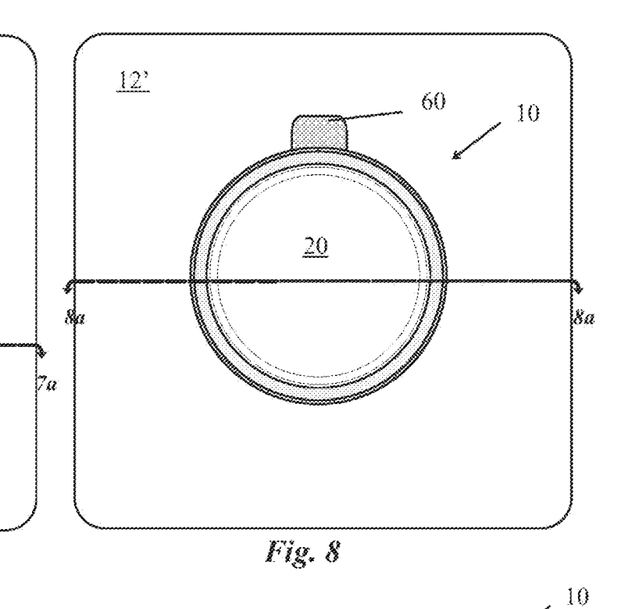
FIG. 8 is a planar view of a container which is a bowl, adhered to loop fastening membrane mounted to the mat and a lift tab having an end that is sewn to the mat, where the mat is mounted on a base, such as a square tile as illustrated in FIG. 7.
Figure 8A:
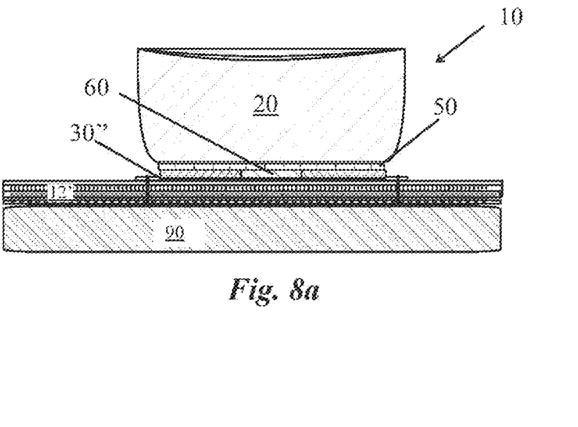

Referring to FIG. 8, which is a planar view of a container 20 which is substantially a flat bottom bowl fitted with a hook fastening membrane 50 is in contact with the loop fastening membrane 30" mounted to the mat. There is a lift tab 60 having an end 44 that is sewn to the mat, and the mat is mounted on a base 90 that is visible in FIG. 8a. FIG. 8a is a cross-sectional view of the bowl and square mat 12' illustrated in FIG. 8 taken along sectional line 8a-8a.

Figure 9:
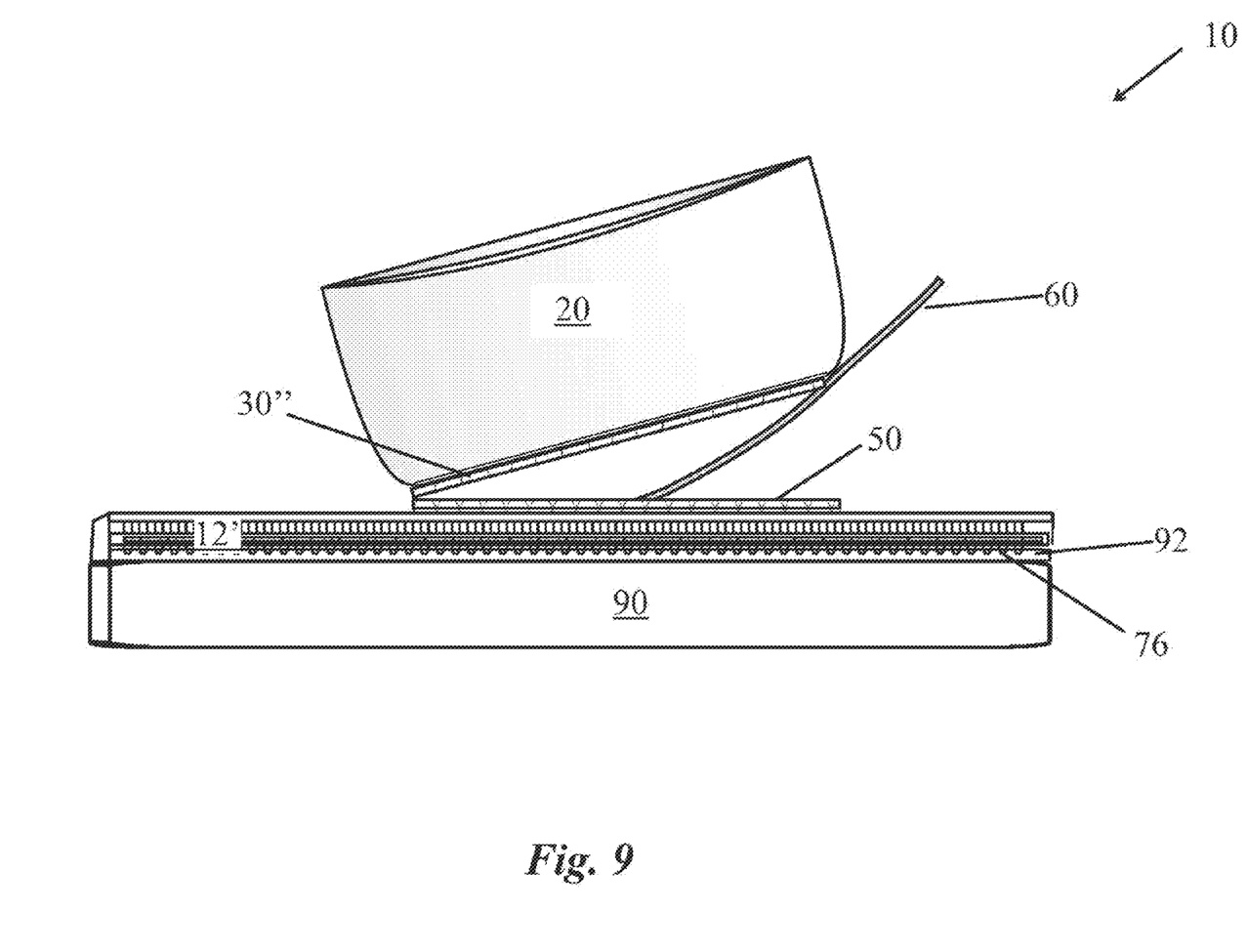

Referring to FIG. 9, the mat 12' is mounted to a base 90 with a cement type permanent adhesive 92 such as an epoxy, acrylic, urethane, PVC, or bituminous adhesive based polymer. Notice that the fleece fibers 76 on the bottom of the mat become embedded in the permanent adhesive 92. The base adds weight, and is appropriately selected to immobilize translational movement. It can be combined with other bases to further secure it position. In this embodiment the container 20 is fitted with a loop fastening membrane 30" and the mat is fitted with a hook fastening membrane 50. The selection of hook and loop is matter of the user's preference. A hook fastening membrane 50 has some adhesion to fuzzy materials, such as carpets, and this may be desirous if the user plans on using the bowl on a carpeted surface without the mat. As shown in the drawing, the lift tab 60 pivots at the sewn end 44.

Figure 10:
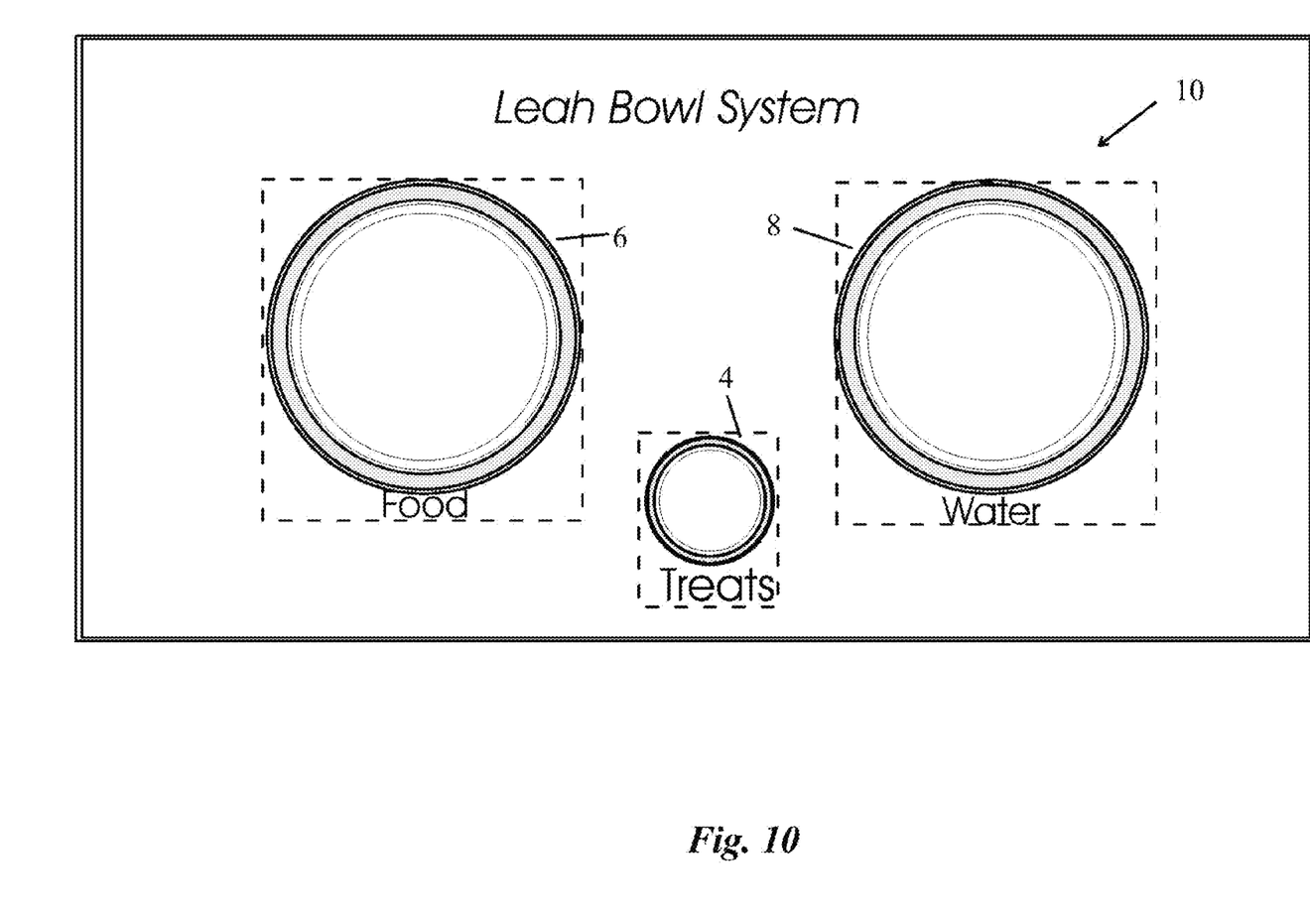
FIG. 10 is a plan view of an embodiment of the invention, a limited eating area hardware system, for organizing and preventing bowls and the like from being turned over or moved about during feeding, wherein the mat is printed, and in this embodiment printed to label where each bowl is to be positioned.

The invention in one embodiment utilizes the characteristic that the mat can be printed, for instance using screen printing or decals that adhere to PVC. Referring to FIG. 10, which is a plan view the limited eating area hardware system, where the system organizes and prevents bowls and the like from being turned over or moved about during feeding. As can be seen, each planar fastening area is labeled for its intended application. In the embodiment the use is a feeding station for pets. There is an area for water 8, an area for food 6, and an area for treats 4, as indicated by the dashed lines (which are optional) and bowls. In another variation, the areas could be designated as to the dog or cat.

Figure 11:
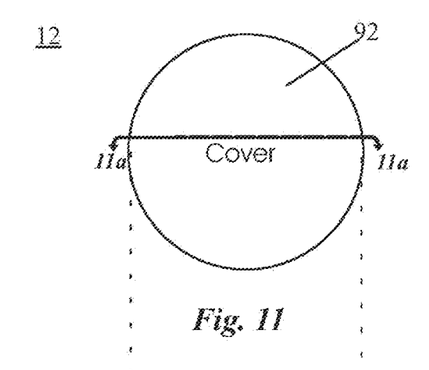
FIG. 11 is a plan view of an embodiment of the invention, illustrating the use of a protective cover over a planar fastening area mounted to the mat when it is not being used to secure a bowl or other container, therein prevent food and other detritus from fouling the planar fastening area.
Figure 11A:
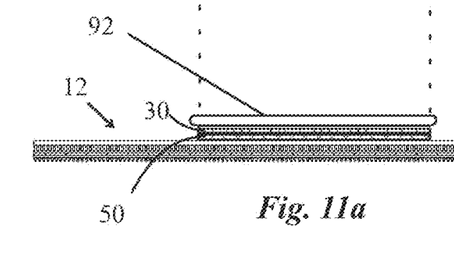

An embodiment of the invention illustrating the use of a protective cover 92 is shown in FIG. 11 and FIG. 11a. The protective cover 92 is a placed on a planar fastening area of the mat when the planar fastening area is not being used to secure a bowl or other container. The a protective cover 92 prevents food and other detritus from fouling the hook or loop fastening membrane on the mat 12. FIG. 11a is a cross-sectional view of the protective cover taken along sectional line 11a-11a. The protective cover includes a plastic layer 94, not unlike the to top layer of the mat 72 and a vessel hook or loop fastening membrane 50 and mat hook or loop fastening membrane 30, where upon contacts the membranes adhere.

Figure 12:
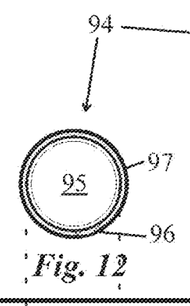
FIG. 12 is a plan view of an embodiment of the invention, a limited eating area hardware system, for organizing and preventing bowls and the like from being turned over, wherein the secured container is a holding device that holds the cup or bowl that actually contains the drink or food, where the of illustrated embodiment is a cup holder.
Figures 12A, 13A:
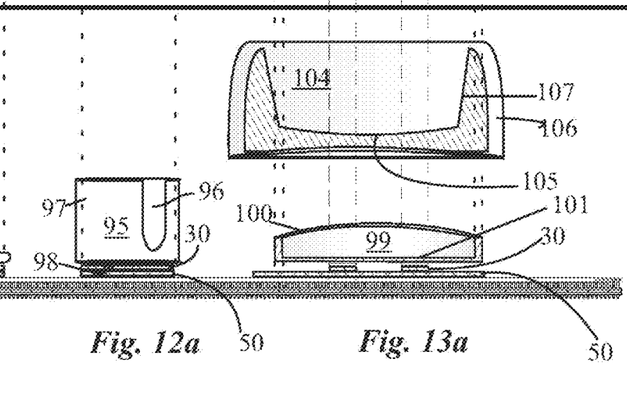
FIG. 12a is a diagrammatic view of the cup holder illustrated in FIG. 12.
FIG. 13a is a diagrammatic view that illustrates how the cut away view of the holding device retains the dog bowl when the bowl is positioned on the holding device. An advantage of a holding device is that it enables the user to keep using his existing feeders with the easy clean up the invented system for organizing and preventing bowls and the like from being turned over or moved about during feeding.

In addition to containers and protective covers, the invention includes holding devices, and protective holders FIG. 12 and FIG. 12a and FIG. 13 and FIG. 13a are views of a holding device 94, where the holding device holds the utensil that actually contains the drink or food. Holding devices are especially useful because they allow a user to use utensils that they already own, and require no special adaptation to fit the utensil with a vessel hook or loop fastening membrane 50. Referring first to FIG. 12 and FIG. 12a, which are illustrations of a mat fitted with a cup holder 95 having side walls, a slot 96 and floor 97, an outer surface of the floor 97 with a vessel hook or loop fastening membrane 50. The cup holder 95 can be selected to be comprised of an insulating material, therein also functioning as protective holding device.

Figure 13:
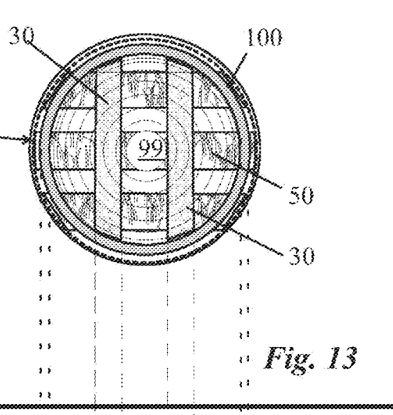
FIG. 13 is a plan view of an embodiment of the invention, where the holding device is a retainer (in this case clear—similar to a Petri dish) which intersects an interior underside of bowls that have a partially shallow bottom, such as a dog bowl with flared walls (sometimes called a skid shirt), and as illustrated the planar fastening area has horizontal strips of Velcro and the holding device has vertical strips of Velcro.

Referring to FIG. 13 and FIG. 13a, the holding device is a retainer tray 99 with a retainer wall 100 and a retainer floor 101. In this embodiment the retainer floor 101 is transparent so that in FIG. 13 a backside of the vessel hook or loop fastening membrane 50 is visible and portions of the mat hook or loop fastening membrane 30 are also visible. The illustrated membranes are strips. The bowl 104 shown in FIG. 13a has not be positioned in FIG. 13. The illustrated bowl 104 is a conventional bowl in that it has a rounded bottom 105. Like many dog bowls and other pet bowls the bottom is elevated with either a ring or an exterior wall 106. The elevation is required to provide the bowl with a flat stabilizing surface on the bottom of the bowl, and still have bowl where liquids will naturally flow to center of the rounded bottom 105. In the illustrated embodiment the bowl 104 has an exterior wall 106 also and an interior wall 107. The invented retainer tray 99 is selected so that the retainer wall 100 has a height and diameter such that when the bowl is seated on the retaining tray, the bowl exterior wall 104 slides over the retainer wall 100, therein preventing the bowl from translational movement.

The system using a Limited Eating Area Hardware, can be used to accommodate substantially any shape vessels, either by directly attaching the hook or loop fastening membrane to the vessel or by attaching the hook or loop fastening membrane to a device that holds the vessel. The system includes a mat having an upper layer with an outer surface that is substantially impervious to water and oils and containers, holding devices, protective covers and protective holders.

The descriptions above and the accompanying drawings should be interpreted in the illustrative and not the limited sense. While the invention has been disclosed in connection with the preferred embodiment or embodiments thereof, it should be understood that there may be other embodiments which fall within the scope of the invention as defined by the following claims. Where a claim is expressed as a means or step for performing a specified function, it is intended that such claim be construed to cover the corresponding structure, material, or acts described in the specification and equivalents thereof, including both structural equivalents and equivalent structures.

What is claimed is:

1. A system for organizing and preventing bowls from being turned over or moved about, said system comprising:

a mat having an upper surface with one or more planar fastening areas, where a planar fastening area has a hook planar fastener, or a loop planar fastener, or a combination of hook and loop planar fasteners, where the mat is comprised of a material that has an interlayer of a coated scrim having a needled felt, therein forming a double-sided fleece with an upper layer of fleece interconnected to a bottom layer of fleece, where the upper layer of fleece is additionally embedded in top layer of a plastic coating that is coated onto the upper layer of fleece, wherein said top layer of a plastic coating is substantially oil, water and weather resistant;

a vessel having a floor with a lower surface, where the lower surface has a layer of a hook fastener or a layer of a loop fastener, where the layer of a hook fastener or the layer of a loop fastener on the vessel will fastened to the hook planar fastener or the loop planar fastener or to the combination of hook and loop planar fasteners on the mat that are complementary;

where a reversible bond between the mat and the vessel is created when the lower surface fastener of the vessel is pressed against the planar fastener of the mat; and where the reversible bond between the mat and the vessel is broken when the vessel and the mat are peeled apart, causing complementary mat and vessel fasteners to release.

2. The system as claimed in claim 1, wherein said plastic coating is selected from the group consisting of plasticized polyvinylchloride (PVC) and plasticized or polyvinyldichloride (PVDC).

3. The system as claimed in claim 1 wherein said vessel is selected from the group consisting of a container, a holding device, a protective cover, and a protective holder.

4. The system as claimed in claim 3, wherein said container is a flat bottom dish or bowl.

5. The system as claimed in claim 3, wherein said holding device holds a utensil.

6. The system as claimed in claim 3, wherein said protective cover is a relatively thin covering element for a planar fastening area when the area is not in use.

7. The system as claimed in claim 1, wherein said hook and loop planar fasteners are on a membrane, which is sewn to the mat.

8. The system as, claimed in claim 1 further comprising a lift tab to augment breaking the reversible bond between the vessel and the mat.

9. The system as claimed in claim 1 further comprises a base, such as plates of metal or tiles or other earthen materials that are much heavier than just the mat, wherein the fleece side of the mat is permanently adhered to the base.

10. The system as claimed in claim 1 wherein the layer of hook fastener or loop fastener is integral with a vessel membrane, where a backside of the vessel membrane is adhered to a bottom of the vessel.

11. A system for organizing and preventing bowls from being turned over or moved about, said system comprising:
   a mat having an upper surface with one or more planar fastening; areas, where a planar fastening area has a hook planar fastener, or a loop planar fastener, or a combination of hook and loop planar fasteners, where the mat is comprised of a material that has an interlayer of a coated scrim having a needled felt, therein forming a double-sided fleece with an upper layer of fleece interconnected to a bottom layer of fleece, where the upper layer of fleece is additionally embedded in top layer of a plastic coating that is coated onto the upper layer of fleece, wherein said top layer of a plastic coating is substantially oil, water and weather resistant;
   a vessel having a floor with a lower surface, where the lower surface has a layer of a hook fastener or a layer of a loop fastener, where the layer of a hook fastener or the layer of a loop fastener on the vessel will fastened to the hook planar fastener or the loop planar fastener or to the combination of hook and loop planar fasteners on the mat that are complementary;
   where a reversible bond between the mat and the vessel is created when the lower surface fastener of the vessel is pressed against the planar fastener of the mat; and
   where the reversible bond between the mat and the vessel is broken when the vessel and the mat are peeled apart, causing complementary mat and vessel fasteners to release;
   a protective cover that is a relatively thin covering element; and
   wherein a user positions the protective cover on the planar fastening area when the area is not in use, as evidenced by the removal of the vessel from the mat, therein protecting the mat membrane.

12. The system as claimed in claim 11, wherein said the plastic coating is selected from the group consisting of plasticized polyvinylchloride (PVC) and plasticized or polyvinyldichloride (PVDC).

13. The system as claimed in claim 11 wherein said vessel is generally characterized as either a container or a holding device.

14. The system as claimed in claim 13, wherein said container has a flat bottom.

15. The system as claimed in claim 13, wherein said holding device holds a utensil.

16. The system as claimed in claim 15, wherein the bottom of said holding device has a hook or loop fastener layer which is integral to a vessel membrane having a backside that is adhered to the bottom of the holding device.

* * * * *